United States Patent [19]

Parker et al.

[11] Patent Number: 5,318,143
[45] Date of Patent: Jun. 7, 1994

[54] METHOD AND APPARATUS FOR LANE SENSING FOR AUTOMATIC VEHICLE STEERING

[75] Inventors: Donald L. Parker, Bryan; Philip Roan, College Station, both of Tex.

[73] Assignee: The Texas A & M University System, College Station, Tex.

[21] Appl. No.: 887,069

[22] Filed: Jun. 22, 1992

[51] Int. Cl.$^5$ .............................................. B60K 31/00
[52] U.S. Cl. ................................. 180/168; 180/170; 180/131; 364/424.02
[58] Field of Search ............... 180/167, 168, 169, 170, 180/175, 176, 177, 178, 131, 179; 356/435, 442, 446, 447; 364/424.02, 426.01, 426.04

[56] References Cited

U.S. PATENT DOCUMENTS

| | | | |
|---|---|---|---|
| 3,740,141 | 6/1973 | DeWitt, Jr. ............... | 356/5 |
| 3,753,126 | 8/1973 | Hines et al. ............... | 328/41 |
| 3,778,159 | 12/1973 | Hines et al. ............... | 356/5 |
| 3,813,165 | 5/1974 | Hines et al. ............... | 356/5 |
| 4,003,049 | 1/1977 | Sterzer et al. ............... | 343/6 R |
| 4,249,176 | 2/1981 | Oishi et al. ............... | 343/6.5 |
| 4,711,316 | 12/1987 | Katou et al. ............... | 180/168 |
| 4,775,023 | 10/1988 | Shimada et al. ............... | 180/168 |
| 4,823,169 | 4/1989 | Ogura ............... | 356/446 |
| 4,925,335 | 5/1990 | Eigenmann ............... | 404/12 |
| 4,926,170 | 5/1990 | Beggs et al. ............... | 340/904 |
| 4,926,171 | 5/1990 | Kelley ............... | 340/961 |
| 4,934,477 | 6/1990 | Dai ............... | 140/271 |
| 4,934,779 | 6/1990 | Dunning ............... | 350/102 |
| 4,965,583 | 10/1990 | Broxmeyer ............... | 342/42 |
| 5,031,101 | 7/1991 | Kaminura et al. ............... | 180/168 |

FOREIGN PATENT DOCUMENTS

| | | | |
|---|---|---|---|
| 0290634 | 11/1988 | European Pat. Off. ............ | 180/168 |
| 47701 | 1/1977 | Japan ............... | 180/168 |
| 0148909 | 8/1984 | Japan ............... | 180/168 |

Primary Examiner—Richard M. Camby
Attorney, Agent, or Firm—Baker & Botts

[57] ABSTRACT

A lane sensing system (20) comprises a processor (22) operable to drive an infrared optical transmitter (24). Light is reflected by a center stripe (18) placed in the center of a highway lane. Reflected light is received in right and left receivers (26) and (28). The processor (22) uses the information to control a power steering control system (30) and a speed control system (32). Information may be encrypted into the center stripe (18) and used by processor (22) to control the speed of the vehicle (10) or to display information to an operator of the vehicle (10) through a display system (34).

20 Claims, 2 Drawing Sheets

METHOD AND APPARATUS FOR LANE SENSING FOR AUTOMATIC VEHICLE STEERING

TECHNICAL FIELD OF THE INVENTION

This invention relates in general to the field of electronic and optical systems and more particularly to an improved method and apparatus for lane sensing for automatic vehicle steering.

BACKGROUND OF THE INVENTION

A variety of systems have been developed to provide for automatic steering of vehicles. Primarily, these systems have been designed for use in the factory or office environment. For example, robot courier and waste management vehicles may be automatically steered by embedding conductive material in the floor along the path on which the vehicle is to travel. These systems are extremely expensive and very difficult to modify due to the physical placement of electric conductors in subflooring of a building. The use of optical tracking systems has not been widely explored. However, similar automatically-steered vehicles have been developed that can track a stripe of material placed on the ceiling above the vehicle. These systems are not suitable for use in a highway environment due to the placement of the stripe above the vehicle. Further, there has been little attention to the problems associated with many vehicles utilizing the pathway to be tracked. Accordingly, need has arisen for an automatic vehicle steering system which is suitable for the highway environment and which addresses the problems associated with many vehicles using the automatic pathway.

SUMMARY OF THE INVENTION

In accordance with the teachings of the present invention, a method and apparatus for lane sensing for automatic vehicle steering is provided that substantially reduces or eliminates problems associated with prior systems.

More particularly, a vehicle control system is provided for controlling a vehicle operable to travel over a surface.

The system comprises a transmitter on the vehicle operable to illuminate a first predetermined area of the surface beneath the vehicle A first receiver on the vehicle receives reflections from a second predetermined area of the surface beneath the vehicle. A second receiver on the vehicle receives reflections from a third predetermined area of the surface beneath the vehicle. The second and third predetermined areas are disposed substantially adjacent one another and comprise portions of the first predetermined area. A processor coupled to the first and second receivers is operable to determine the difference in the amplitudes of the reflections received by the first and second receivers and generate a steering control signal responsive to the difference. A stripe is disposed on the surface and illuminated by the transmitter resulting in the difference when the stripe is not disposed equally in the second and third predetermined areas.

BRIEF DESCRIPTION OF THE DRAWINGS

A more complete understanding of the present invention may be acquired by referring to the Detailed Description in connection with the accompanying drawings, in which like reference numbers indicate like features and wherein.

DETAILED DESCRIPTION OF THE INVENTION

Figure 1:
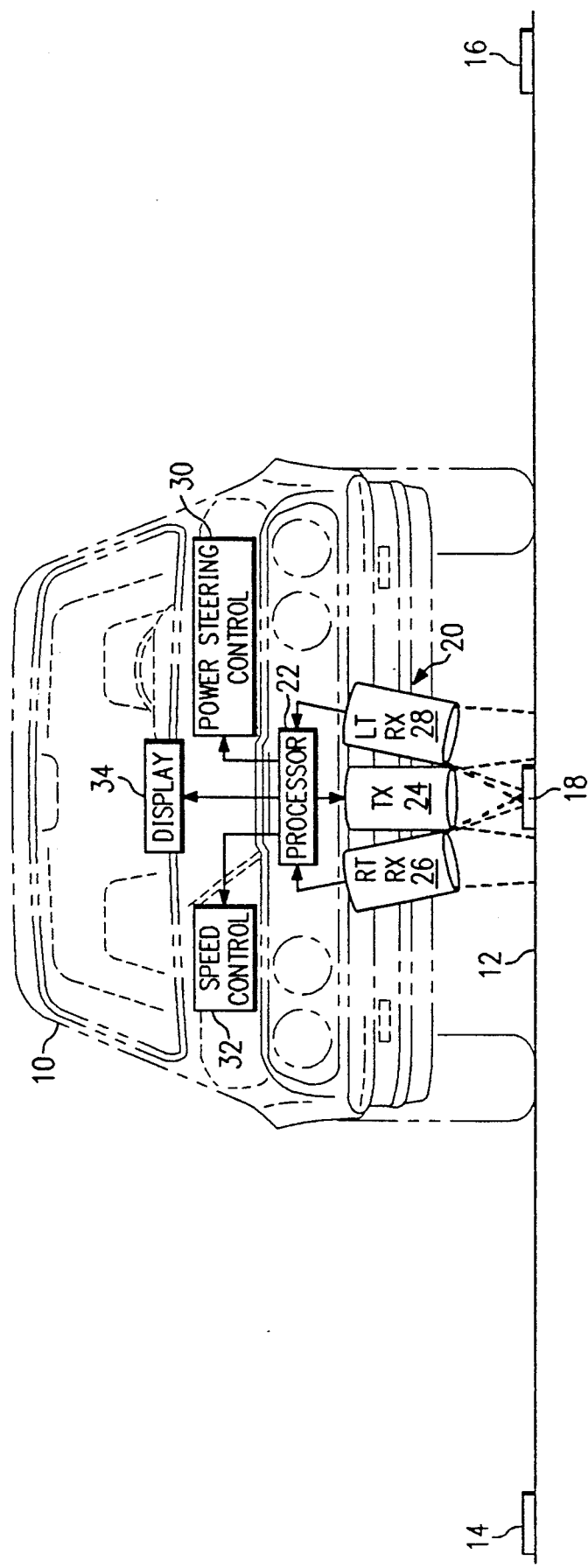
FIG. 1 is a schematic illustration illustrating the operation of the lane sensing method and apparatus of the present invention.

FIG. 1 illustrates an automobile 10 which is travelling along a road surface 12 Road surface 12 incorporates conventional lane markers 14 and 16 which are painted on the road surface 12. Lane markers 14 and 16 comprise highly reflective stripes incorporating glass beads or other reflective medium to provide high visibility lane indicators in modern highways. Road surface 12 also incorporates a center stripe 18 which may also comprise the reflective material used to form lane markers 14 and 16. Center stripe 18 is placed in the center of the highway lane and is optically tracked by the lane sensing apparatus of the present invention.

Automobile 10 comprises the lane sensing apparatus of the present invention indicated generally at 20 in FIG. 1. Lane sensing system 20 comprises a processor 22 which drives an infrared transmitter 24. Infrared transmitter 24 shines a beam of infrared light on a section of the road surface 12 indicated in FIG. 1. System 20 further comprises a right infrared receiver 26 and a left infrared receiver 28. Receivers 26 and 28 are capable of receiving infrared light reflected from particular sections of roadway surface 12 indicated in FIG. 1. The sections viewed by right and left receivers 26 and 28 slightly overlap in the center of the section of the roadway surface 12 illuminated by transmitter 24. In general, the processor 22 will receive two electrical signals, one from each of right and left receivers 26 and 28. These signals will differ in magnitude depending on the position of center stripe 18 within the area viewed by right and left receivers 26 and 28. By dynamically adjusting the direction of the vehicle 10, the system 20 will cause the signals received from right and left receivers 26 and 28 to equate. When the signals are the same, the center stripe 18 is centered beneath the automobile 10 and the automobile 10 can dynamically track the center stripe 18 and thus remain in the center of the lane as it travels.

Processor 22 also transmits control signals to a power steering control 30 and a speed control 32. Power steering control 30 may comprise conventional electronic and hydraulic systems common in modern power steering systems. Additionally, power steering control may comprise a parallel system of automatic steering control which can be controlled by processor 22 as will be discussed herein.

Speed control 32 may comprise conventional speed control systems common in modern automobiles As will be discussed herein, coded data may be included and incorporated into center stripe 18. By reading this coded data, the processor 22 can display information coded in the center strip 18 to the driver of the vehicle using a display system 34. In addition, the speed of the vehicle can be ascertained due to regular intervals used in the code incorporated in center stripe 18. This speed data can be used to keep the vehicle speed constant using speed control 32. If all automobiles travelling in the lane comprise a lane sensing apparatus 20, the lane incorporating center stripe 18 may use a very high posted required speed. All vehicles travelling in the lane incorporating center stripe 18 would read the same data and therefore could travel at identical speeds. Because of the automated nature of the system 20, vehicles could travel at very high speeds positioned very close together during travel. Accordingly, the system and method of the present invention could dramatically increase the flow rate of modern highways and thereby decrease traffic congestion and travel time.

Center stripe 18 may incorporate a conventional three of nine code which is commonly used in bar code systems. For example, the center stripe could be painted in four inch intervals. The three of nine code, as is common in most optical coding systems, enjoys the advantage that its average rate of low to high transitions is a constant. In the three of nine code, the forty most commonly used characters are encoded using fourteen blocks. All forty characters comprise seven white blocks and seven black blocks. Accordingly, the black-to-white ratio for all the characters is constant. The processor 22 can thus count the low-to-high transitions for a proportional indication of the speed of the vehicle.

The data which may be coded into center stripe 18 can be used for a variety of reasons. Location codes can be encrypted into the center stripe 18 and then input into a mapping system incorporated in display system 34. In this manner, a mapping system may ascertain the exact location of the vehicle 10. This method is greatly superior to the satellite global positioning systems currently used in automatic mapping technology. The system of the present invention can furnish a mapping system with an exact direction and lane position which is much more useful than the longitude and latitude supplied by global positioning systems.

The data encrypted in center stripe 18 can also be used to dynamically control the speed of a vehicle. Control characters may be encrypted in the center stripe 18 to automatically instruct a vehicle to slow down at dangerous curves in a roadway, for example. Once again, as all cars on the roadway receive exactly the same information from the center stripe 18, all the vehicles will slow and accelerate at the same rate and time. Accordingly, vehicles may still travel closely positioned together at very high speeds Indications of the hazardous road conditions or any other information which is currently displayed in road signs may be encrypted into the center stripe 18 and used in parallel to actively control the vehicle and display the required information to the driver of the vehicle 10 on display 34. Display 34 may comprise, for example, a conventional CRT screen, LCD screen, or other conventional visual display. Alternatively, data from processor 22 may be used to drive automated speech technology to provide audible information to the driver of vehicle 10.

Figure 2:
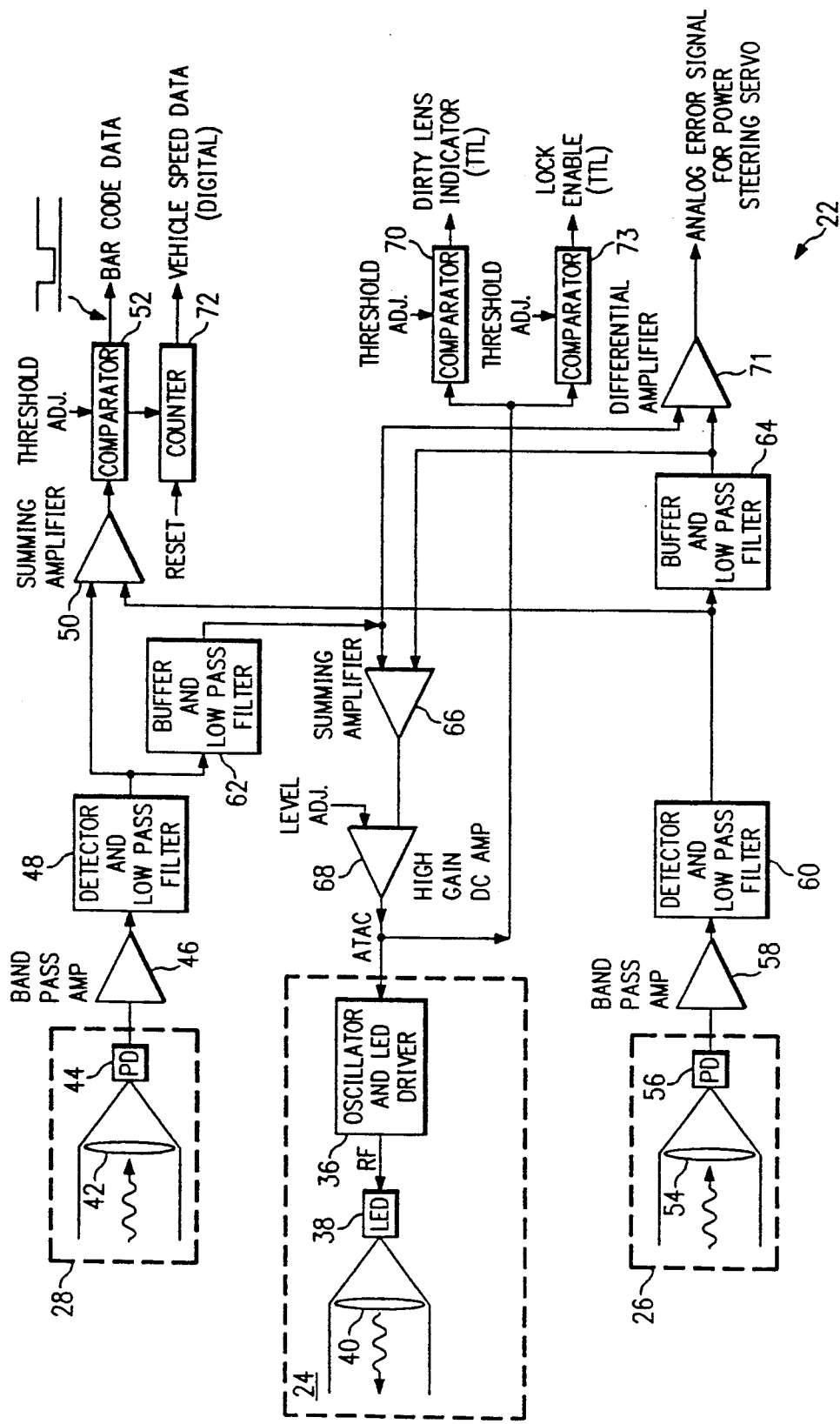
FIG. 2 is a block diagram of an electro-optic system used in the lane sensing apparatus of the present invention.

FIG. 2 is a detailed schematic illustration of the electro-optical portion of system 20. Referring to FIG. 2, transmitter 24 is shown to comprise an oscillator and LED driver 36 which is used to drive an infrared LED 38 which emits infrared light through a lens 40. Lens 40 columnates the light so that it illuminates a predefined area on the roadway surface 12 as described previously. Oscillator and LED driver 36 may comprise, for example, a 455 kHz oscillator and conventional driver circuitry. A portion of the RF frequency infrared signal is reflected from the surface of the roadway 12 and into the left receiver 28 shown in FIG. 2. Left receiver 28 is shown to comprise a lens 42 which focuses the reflected infrared light onto a photo diode 44 that converts the received light into an electronic signal. The lens 42 may comprise an inexpensive Fernel lens as its sole purpose is gathering of the reflected light because image quality is not a concern in the present system. The electronic signal is transmitted from photo diode 44 into a bandpass amplifier 46 which operates to filter noise from the received signal and pass only the RF frequency transmitted from the transmitter 24. The filtered signal is input into a detector and low pass filter 48. Detector and filter 48 operates to filter out the RF frequency components of the received signal to leave only a signal representing the envelope of the received signal. The amplitude of the signal transmitted from detector and low pass filter 48 includes two pieces of information. The low frequency transitions in the signal result from the information encrypted into the center stripe 18 using the three of nine code discussed previously. The amplitude of the signal indicates the amount of light being received by receiver 28. This amplitude may be compared to the amplitude of the signal similarly received by receiver 26 in a differential fashion to determine the positioning of center stripe 18 with respect to left and right receivers 26 and 28.

In order to retrieve the coded data, the signal from detector and low pass filter 48 is transmitted to a summing amplifier 50. Summing amplifier 50 receives signals from the right and left receivers 26 and 28 and outputs the sum to a comparator 52 that compares the received signal to a programmable threshold value and outputs a clean digital square wave signal that contains the coded information.

Right receiver 26 is identical to left receiver 28 and comprises a similar lens 54 and a photo diode 56 which are identical to lens 42 and photo diode 44 discussed previously. Photo diode 56 outputs an electric signal to a bandpass amplifier 58 which is identical to bandpass amplifier 46 discussed previously. Signals are transmitted from amplifier 58 to detector and low pass filter 60 which is identical to a detector and low pass filter 48 described previously. The signal from detector and low pass filter 60 is also routed to summing amplifier 50 so that the coded information can be extracted from any signals received from the right receiver 26. The signals from the right receiver 26 and left receiver 28 are summed prior to extracting the bar coded information such that no matter where the center stripe 18 is positioned relative to the right and left receivers 26 and 28, the coded information can be extracted.

The signal from detector and low pass filter 48 is also routed through a buffer and low pass filter 62. Buffer and low pass filter 62 operates to pass only the DC component of the signal received from detector and low pass filter 48. As a result, buffer and low pass filter 62 outputs a slowly varying DC signal which is related to the amount of light received by receiver 28. Similarly, the signal from detector and low pass filter 60 is routed to an identical buffer and low pass filter 64 which generates a slowly varying DC signal which is related to the amount of light received by receiver 26. The slowly varying DC signal from buffer and low pass filter 64 and the slowly varying DC signal from buffer and low pass filter 62 are both input into a summing amplifier 66 that combines the two signals and outputs a combined signal that is input into a high gain DC amplifier 68. The high gain DC amplifier 68 outputs an automatic transmitter attenuation control signal [ATAC signal] into oscillator and LED driver 36. This signal is used to control the amount of light which is transmitted from transmitter 24. The greater the ATAC signal, the less light is transmitted from transmitter 24. Accordingly, a feedback loop is closed using the optical path from the transmitter 24 through the receivers 26 and 28 resulting in a constant sum of the signals received. Accordingly, regardless of the degree of reflectivity of center stripe 18 or the contrast between center stripe 18 and the remainder of the road surface 12, the signal output from summing amplifier 66 will remain substantially constant. The high gain DC amplifier 68 operates as a comparator. When the sum of the received light signals output from the summing amplifier 66 is below a predetermined level set by the other input to amplifier 68, the output of amplifier 68 is a minimum value near zero volts. In this state, the LED transmits the maximum amount of light possible. This state is not normal and will only occur with some malfunction, very dirty lenses, or very poor reflectivity from the painted stripe 18. Since the DC amplifier has very high gain, say 100,000, when the sum of the received light signals output from the summing amplifier 66 tries to go above the predetermined level, the output of DC amplifier 68 rises to whatever value is necessary to attenuate the amplitude of the light transmitted by the LED so that the sum of the received light signals is held essentially constant.

Because the signal output by high gain DC amplifier 68 is a direct measure of the optical coupling between the LED and the receivers, photodiodes, it can be compared to preset values to determine whether or not the vehicle is tracking the center stripe 18 and whether or not the system is functioning properly. In order to accomplish these functions, the signal from amplifier 68 is routed to a comparator 70 and a comparator 73. Comparator 70 compares the value of the signal received from amplifier 68 to a programmable value to determine whether or not sufficient reflected signal is being received by the receivers 26 and 28. The output of comparator 70 may be used as a system fault indicator indicating that the lenses on the transmitter or receiver are dirty or some other fault exists with the system. Similarly, comparator 73 compares the signal received from amplifier 68 to a higher programmable value to indicate that the lane sensing apparatus 20 has locked onto the center stripe 18. The comparator 73 may output a signal which may be used to drive an indicator light or other indicia visible or apparent to the driver of vehicle 10. According to alternate embodiments of the present invention, the lock enable signal may be used directly or may be ANDed with other enable signals and used as an enable signal for the automatic power steering control 30.

The signals from buffer and low pass filter 62 and buffer and low pass filter 64 are also output to a differential amplifier 71 which compares the two signals and outputs an analog signal which is a measure of the difference between the light received from the right receiver 26 and the left receiver 28. This analog signal can be used directly or indirectly to responsively drive the automatic steering servo until the values received from the right and left receivers 26 and 28 are equated, indicating that the center stripe 18 is centered beneath the vehicle 10.

According to one embodiment of the present invention, the signal output by differential amplifier 7 is used to drive a parallel system for actuating the power steering of vehicle 10. Conventional power steering systems operate to port hydraulic fluid into alternate sides of a ram which is used to mechanically steer the vehicle. The signal from differential amplifier 71 may be used to drive parallel ports into opposite sides of the ram. These parallel ports could be small compared to the primary ports actuated by the driver of the vehicle due to the fact that the deflections necessary for maintaining the vehicle in the center of the lane will be small compared to the deflections necessary for ordinary driving of the vehicle. In this manner, the driver of vehicle 10 may choose to steer the vehicle at any time and mechanically override the automatic steering system of the present invention.

Processor 22 may receive input from a variety of sources to drive the power steering of the vehicle. The lane sensing apparatus of the present invention could be used in parallel with conventional accelerometers to provide damping for the overall steering of the vehicle 10. For example, an accelerometer could be used to provide a counteracting steering reaction to a gust in a crosswind. Conventional accelerometers can react much more quickly than the human driver of the vehicle 10. The processor 22 may operate the power steering control 30 in response to parallel signals from such accelerometers and the lane sensing apparatus described previously.

Referring again to FIG. 2, the coded data is also output from comparator 52 to a counter 72 that operates to count the transitions in the coded signal. As discussed previously, if a conventional three of nine code is used, the average of the transitions in the signal over time will remain constant. Therefore, the measure of the number of transitions per unit time is directly proportional to the speed of the vehicle. The output of counter 72 may thus be used as a feedback signal to a speed control unit 32 to maintain a constant vehicle speed. As discussed previously, the processor 22 outputs both the vehicle speed indication data and the desired speed of the vehicle to the speed control 32. The processor 22 may receive the desired speed from the driver of vehicle 10 or, in the alternative, the desired speed of the vehicle may be encrypted into the data of center stripe 18. The speed data encrypted in center stripe 18 may call for a constant velocity or call for changes in velocity to account for road conditions.

A important technical advantage of the present invention inheres in the fact that the optical sensing capability of the lane sensing apparatus can be used for not only conventional travel, but also for road maintenance. The initial painting of center stripe 18 on a highway is a relatively simple matter. The painting apparatus may travel down the center of the lane while the encryption of the information into the center stripe can be handled by digitally controlling the spray mechanism in the painting apparatus. The repainting of a roadway presents a slightly more difficult problem, which is also solved by the teachings of the present invention. The lateral positioning and the intervals within the stripe to be repainted may both be sensed by the system of the present invention. The data from the comparator 52 may be used directly or indirectly to actuate the painting mechanism to accurately repaint the same transitions and lateral position of the stripe 18.

Although the present invention has been described in detail, it should be understood that various changes, alterations and substitutions can be made to the system described herein without departing from the spirit and scope of the present invention which is defined solely by the appended claims.

What is claimed is:

1. A vehicle control system for controlling a vehicle operable to travel over a surface, the system comprising:
   a transmitter on the vehicle operable to illuminate a first predetermined area of the surface beneath the vehicle;
   first receiver on the vehicle operable to receive reflections from a second predetermined area of the surface beneath the vehicle;
   a second receiver on the vehicle operable to receive reflections from a third predetermined area of the surface beneath the vehicle, said second and third predetermined areas disposed substantially adjacent one another and each comprising portions of said first predetermined area; and
   a processor coupled to said first and second receivers and operable to determine the difference in the amplitudes of the reflections received by said first and second receivers and generate a steering control signal responsive to said difference, said first and second receivers receiving reflections from a stripe broken in predetermined intervals of unmarked and reflective areas disposed on the surface and illuminated by the transmitter resulting in said difference when said stripe is not disposed equally in said second and third predetermined areas.

2. The system of claim 1 wherein said reflections received by said first and second receivers vary in response to said intervals, said processor further comprising circuitry for counting said intervals to yield a value proportional to the speed of the vehicle, said processor circuitry further operable to generate a speed signal indicating the speed of the vehicle.

3. The system of claim 2 and further comprising a speed control system operable to receive said speed signal and adjust the speed of the vehicle so as to keep the speed of the vehicle constant.

4. The system of claim 1 wherein said stripe incorporates coded information according to positioning of said unmarked and reflective areas within said predetermined intervals and wherein said reflections received by said first and second receivers vary in response to said intervals, said processor further comprising circuitry for determining said coded information in said intervals.

5. The system of claim 4 wherein said coded information comprises information indicating a necessary change in the speed of the vehicle and wherein said processor circuitry is further operable to generate a speed control signal indicating the speed to be adopted by the vehicle.

6. The system of claim 5 and further comprising a speed control system operable to receive said speed control signal and adjust the speed of the vehicle so as to adopt the speed indicated by the coded information.

7. The system of claim 4 wherein said coded information comprises alphanumeric characters, the system further comprising a display coupled to said processor and operable to display said alphanumeric characters to a user of the system.

8. The system of claim 4 wherein said coded information comprises information indicating the location of the vehicle, the system further comprising a display coupled to said processor and operable to display said location to a user of the system.

9. The system of claim 4 wherein said coded information comprises information ordinarily displayed on road signs, the system further comprising a display coupled to said processor and operable to display said information to a user of the system.

10. The system of claim 1 wherein said processor comprises circuitry for generating an attenuation control signal associated with the amount of reflection received from the surface, said transmitter coupled to said attenuation control signal and operable to attenuate the amplitude of the signal used to illuminate said first predetermined area of the surface such that the amount of the reflection received by the system remains substantially constant when the stripe is illuminated.

11. A vehicle control system for controlling a vehicle operable to travel over a surface, the system comprising:
    a transmitter on the vehicle operable to illuminate a first predetermined area of the surface beneath the vehicle;
    a first receiver on the vehicle operable to receive reflections from a second predetermined area of the surface beneath the vehicle;
    a second receiver on the vehicle operable to receive reflections from a third predetermined area of the surface beneath the vehicle, said second and third predetermined areas disposed substantially adjacent one another and each comprising portions of said first predetermined area;
    a processor coupled to said first and second receiver and operable to determine the difference in the amplitudes of the reflections received by said first and second receivers and generate a steering control signal responsive to said difference, said first and second receivers receiving reflections from a reflective areas disposed on the surface and illuminated by the transmitter resulting in said difference when said stripe is not disposed equally in said second and third predetermined areas, said reflections received by said first and second receivers varying in response to said intervals, said processor comprising circuitry for counting said intervals to yield a value proportional to the speed of the vehicle, said processor circuitry further operable to generate a speed signal indicating the speed of the vehicle;
    a speed control system operable to receive said speed signal and adjust the speed of the vehicle so as to keep the speed of the vehicle constant.

12. The system of claim 11 wherein said stripe incorporates coded information according to positioning of said unmarked and reflective areas within said predetermined intervals and wherein said reflections received by said first and second receivers vary in response to said intervals, said processor further comprising circuitry for determining said coded information in said intervals.

13. The system of claim 12, wherein said coded information comprises information indicating a necessary change in the speed of the vehicle and wherein said processor circuitry is further operable to generate a speed control signal indicating the speed to be adopted by the vehicle.

14. The system of claim 13 and further comprising a speed control system operable to receive said speed control signal and adjust the speed of the vehicle so as to adopt the speed indicated by the coded information.

15. The system of claim 12 wherein said coded information comprises alphanumeric characters, the system further comprising a display coupled to said processor and operable to display said alphanumeric characters to a user of the system.

16. The system of claim 12 wherein said coded information comprises information indicating the location of the vehicle, the system further comprising a display coupled to said processor and operable to display said location to a user of the system.

17. The system of claim 12 wherein said coded information comprises information ordinarily displayed on road signs, the system further comprising a display coupled to said processor and operable to display said information to a user of the system.

18. The system of claim 11 wherein said processor comprises circuitry for generating an attenuation control signal associated with the amount of reflection received from the surface, said transmitter coupled to said attenuation control signal and operable to attenuate the amplitude of the signal used to illuminate said first predetermined area of the surface such that the amount of the reflection received by the system remains substantially constant when the stripe is illuminated.

19. A method for controlling a vehicle operable to travel over a surface, the method comprising the steps of:

illuminating a first predetermined area of the surface beneath the vehicle using a transmitter on the vehicle;

receiving reflections from a second predetermined area of the surface beneath the vehicle using a first receiver on the vehicle;

receiving reflections from a third predetermined area of the surface beneath the vehicle using a second receiver on the vehicle, the second and third predetermined areas disposed substantially adjacent one another and each comprising portions of the first predetermined area;

determining the difference in the amplitudes of the reflections received by the first and second receivers using a processor coupled to the first and second receiver; and generating a steering control signal responsive to the difference using the processor, the reflections being received from a stripe broken in predetermined intervals of unmarked and reflective areas disposed on the surface and illuminated by the transmitter resulting in the difference in the amplitudes when the stripe is not disposed equally in the second and third predetermined areas.

20. The method of claim 19 wherein the reflections received by the first and second receivers vary in response to the intervals, the method further comprising the steps of:

counting the intervals to yield a value proportional to the speed of the vehicle;

generating a speed signal indicating the speed of the vehicle; and adjusting the speed of the vehicle so as to keep the speed of the vehicle substantially constant using a speed control system operable to receive the speed signal.

* * * * *

UNITED STATES PATENT AND TRADEMARK OFFICE
CERTIFICATE OF CORRECTION

PATENT NO. : 5,318,143
DATED : June 7, 1994
INVENTOR(S) : Parker, et al

It is certified that error appears in the above-indentified patent and that said Letters Patent is hereby corrected as shown below:

Column 7, line 10, before "first" insert -- a --.

Column 8, line 36, after "from a" insert -- stripe broken in predetermined intervals of unmarked and --.

Signed and Sealed this

Fifth Day of September, 1995

Attest:

BRUCE LEHMAN

*Attesting Officer*  *Commissioner of Patents and Trademarks*